United States Patent
Cepulis et al.

[11] Patent Number: 6,061,754
[45] Date of Patent: *May 9, 2000

[54] DATA BUS HAVING SWITCH FOR SELECTIVELY CONNECTING AND DISCONNECTING DEVICES TO OR FROM THE BUS

[75] Inventors: Darren J. Cepulis; Siamak Tavallaei, both of Spring; Alexander C. Ekrot, Humble, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,615

[22] Filed: Jun. 25, 1997

[51] Int. Cl.[7] .................................................. G06F 13/00

[52] U.S. Cl. ........................... 710/126; 710/129; 710/131

[58] Field of Search ...................................... 395/306, 307, 395/311, 830, 831, 833, 853; 710/126, 127, 131, 10, 11, 13, 33, 129

[56] References Cited

U.S. PATENT DOCUMENTS

| | | | |
|---|---|---|---|
| 4,032,893 | 6/1977 | Moran | 340/825.83 |
| 4,575,759 | 3/1986 | Griepentrog et al. | 358/181 |
| 5,047,708 | 9/1991 | Kondner, Jr. | 324/73.1 |
| 5,182,801 | 1/1993 | Asfour | 709/214 |
| 5,430,663 | 7/1995 | Judd et al. | 364/550 |
| 5,481,679 | 1/1996 | Higaki et al. | 710/128 |
| 5,664,152 | 9/1997 | Ezzet | 710/126 |
| 5,727,171 | 3/1998 | Iachetta, Jr. | 710/107 |
| 5,796,968 | 8/1998 | Takamiya | 710/113 |
| 5,862,359 | 1/1999 | Nozuyama | 710/131 |

*Primary Examiner*—Ayaz R. Sheikh
*Assistant Examiner*—Ario Etienne
*Attorney, Agent, or Firm*—Sharp, Comfort & Merrett, P.C.

[57] ABSTRACT

A data bus structure is disclosed. The structure includes a data bus having a bus agent connection point and a bus switch to selectively connect or disconnect the connection point to or from the data bus. A method of reconfiguring a data bus structure is also disclosed. The method includes providing two bus agent connection points on a data bus and a bus switch between the bus agent connection points and selecting the number of bus agent connection points on the bus by controlling the state of the bus switch.

30 Claims, 9 Drawing Sheets

DATA BUS HAVING SWITCH FOR SELECTIVELY CONNECTING AND DISCONNECTING DEVICES TO OR FROM THE BUS

This invention relates to shared data buses.

BACKGROUND

Personal computers and communication equipment provide for expansion of hardware functionality by the use of expansion buses. An early personal computer expansion bus used in personal computers based on Intel x86 processors was known as the Industry Standard Architecture (ISA) bus. The ISA bus allowed circuit boards to be compatibly added to a personal computer, thereby providing additional functionality. The ISA bus operated at a maximum bus frequency of 8.33 megahertz (MHz) and transferred data over a 16-bit data bus.

As personal computers became more powerful, the 8.33 MHz ISA bus became a bottleneck restricting data transfer between the processor and ISA bus peripherals. Alternative bus structures were developed to supplement or replace the ISA bus. One solution was the Extended Industry Standard Architecture (EISA) bus providing 32-bit data paths and high speed data transfer functions while maintaining backward compatibility with the ISA bus. A competing solution was the Micro-Channel Architecture (MCA) offered by IBM. This bus also offered 32-bit data paths and high speed data transfer functions, but did not maintain backward compatibility with the ISA bus.

As processing speed further increased and microprocessor architectures diversified, a need arose for a high-speed microprocessor independent bus. This need was met by the development of the Peripheral Component Interconnect (PCI) bus. The PCI bus provides a high speed, microprocessor independent bus that can be used to either replace or supplement existing expansion buses. The PCI bus is defined in the Peripheral Component Interconnect Specification, versions 1.0, 2.0 and 2.1 available from the PCI Special Interest Group, Portland, Oreg. PCI buses typically have either a 32-bit data path or a 64bit data path and typically have operating frequencies between 0 MHz and 33 MHz or between 0 MHz and 66 MHz. This enables, for example, a maximum data transfer speed of 133 Mbytes/second for a 32-bit bus operating at 33 MHz and up to 533 Mbytes/second for a 64-bit bus operating at 66 MHz.

In addition to the ISA, MCA, EISA, and PCI buses, numerous other general purpose and special purpose data buses may be present in a computer system. Example data buses include Fiber Channel buses, IEEE 1394 or "Tire Wire" buses, Universal Serial Bus (USB), Small Computer System Interface buses (SCSI), Pentium-Pro processor buses (P6 bus), and various other communication buses. Additionally, a computer system may have more than one data bus and may contain multiple differing buses.

Numerous peripheral devices, also known as "bus agents," may be added to a computer system over the system's data buses. For example, hard disk drives and their controllers, video output devices, audio input and output devices, network interface devices, memory devices, keyboards, photo scanners, magnetic tape controllers, and numerous other devices may be added to the computer system. The performance and flexibility of a computer system is, in part, determined by the ability to connect such devices and by the characteristics of the device connections. Maximum bus data transfer speed, the maximum number of devices that can be connected to a data bus, the overall bus utilization, and the balancing of data traffic across multiple data buses all impact the efficiency of a computer system.

Consequently, a need exists to configure bus characteristics so as to maximize system performance and flexibility.

SUMMARY

In general, in one aspect, the invention features a data bus including a bus agent connection point and a bus switch on the data bus. The bus switch operates to connect or disconnect the bus agent connection point to or from the data bus.

Implementations of the invention can include one or more of the following. The bus switch may be electronically operated and may include bus signal termination functionality. The signal termination functionality may further include a resistive element selectively coupled to the bus. The data bus may be operable is a first bus frequency range when the connection points is connected to the data bus and operable is a second bus operating frequency range with a greater maximum operating frequency when the connection points is disconnected from the first data bus. Additionally, the data bus may have signal paths formed on a motherboard and may provide connection points for PCI bus agents.

In general, in another aspect, the invention features a data bus structure including a first data bus coupled by a signal path to a second data bus. The signal path coupling the first data bus to the second data bus includes a bus agent connection point and bus switching circuitry. The bus switching circuitry selectively connects the bus agent connection point to the first or the second data bus.

Implementations of the invention may include one or more of the following. Bus switching circuitry can include two bus switches on the signal path between the first data bus and the second data bus with a bus agent connection point between the two switches. Each of the bus switches may selectively connect or disconnect the signal path between the first data bus and the second data bus at the switch. Bus switches may further include bus signal termination functionality that may include a resistive element selectively coupled to the bus.

The first data bus may be operated in a first data bus operating frequency range when the bus agent connection point is connected to the first data bus and operable in a second bus operating frequency range when bus agent connection point is disconnected from the first data bus. The maximum operating frequency of the first and second ranges may be, respectively, in the range of 0 MHz to 33 MHz and the range of 33 MHz to 66 MHz. The data bus can have PCI signal paths and can have signal paths formed on a motherboard.

In general, in another aspect, the invention features a method of reconfiguring a data bus. The method includes providing two bus agent connection points on a data bus and a bus switch between the connection points. The method further includes selecting the number of connection points on the bus by controlling the state of the bus switch. Implementations of the invention may include determining bus utilization and selecting the number of connection points based on bus utilization.

In general, in another aspect, the invention features a data bus structure including a first and a second data bus having signal paths coupled to a bus switch and having a bus agent connection point connected to the bus switch. The bus switch is operable to selectively couple either the first data bus or the second data bus to the connection point. Implementations of the invention may include one or more of the following features. The bus switch may be an electronically controlled bus switch. Data bus signal paths may be formed on a motherboard, and the bus agent connection point may receive a PCI bus agent.

In general, in another aspect, the invention features a computer system including a processor, a data bus interfaced to the processor, and a switching device to reconfigure the number of bus agent connecting points on the bus. Implementations of the invention may include one or more of the following features. The data bus may be a PCI data bus and may interfaces to the processor by a host-to-PCI bridge. The data bus may supports a first maximum operating frequency in a first configuration and a second, greater, maximum operating frequency in a second configuration.

An advantage of the invention is the ability to balance traffic on data buses. Another advantage of the present invention is the ability to maximize data transfer rates on data buses. Still another advantage is the ability to disconnect a malfunctioning bus agent from a data bus. Other advantages and features will become apparent through the following description and from the claims.

DESCRIPTION OF THE DRAWINGS

In the foregoing figures, like numbers refer to like components.

DETAILED DESCRIPTION

Figure 1:
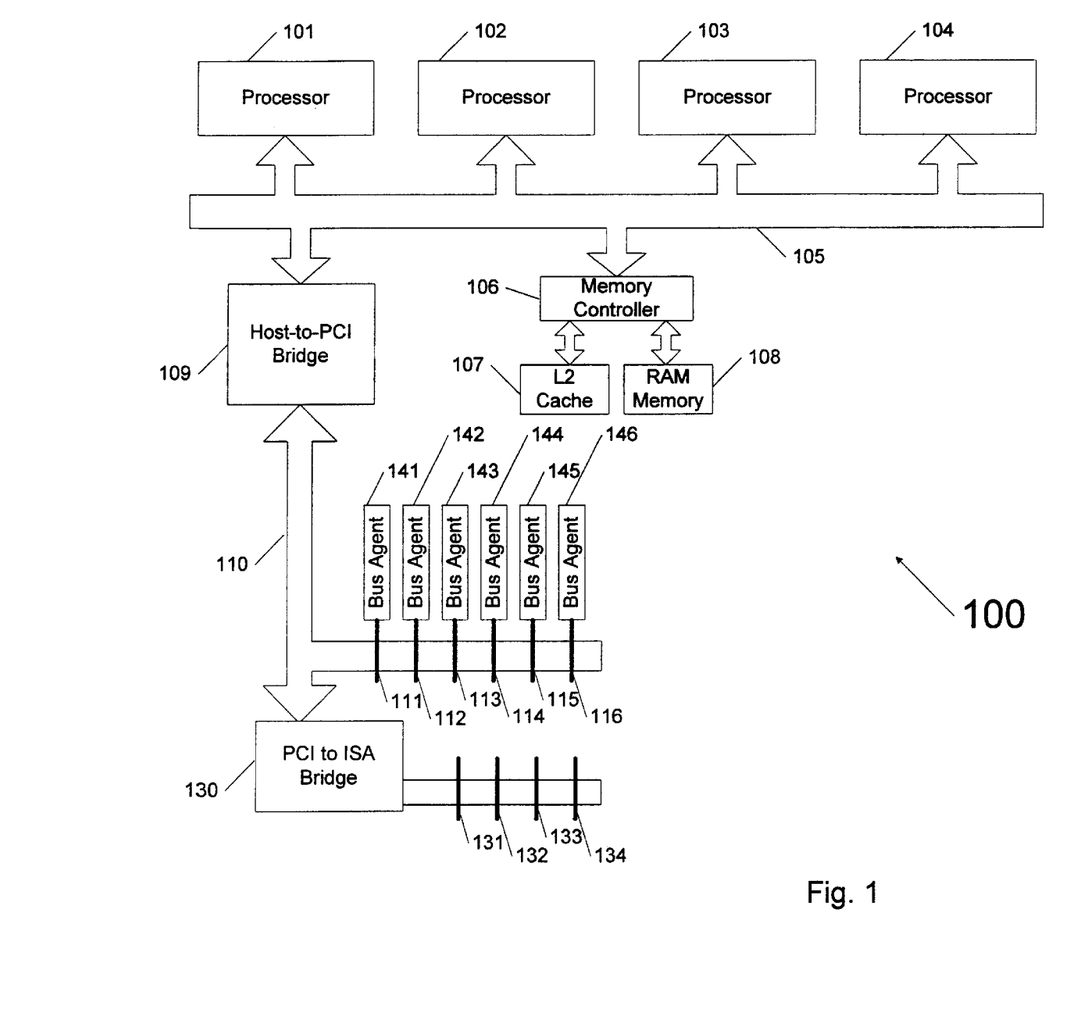
FIG. 1 schematically illustrates a computer system having a PCI bus.

Referring to FIG. 1, a computer system 100 has a PCI bus 110 and one or more central processors (CPUs) 101–104 connected to a processor host bus 105. The processors 101–104 may be, for example, Intel Pentium-Pro (TM) processors. The processors share the processor host bus 105 which carries data, address and control signals. A memory controller 106 is connected to the host bus 105 and provides an interface to random access memory 108. A Host-to-PCI bridge 109 is also connected over the host bus 105. The bridge 109 permits signals on the PCI bus 110 to be compatibly exchanged with signals on the processor host bus 105. Additionally, the bridge 109 provides PCI bus 110 data buffering and data transfer rate matching to allow, for example, a processor having a 64-bit 66 MHz interface and a 533 Mbytes/second data transfer rate to be interfaced to a PCI bus having a data path differing in, for example, data path bit width, clock speed, or data transfer rate. The system 100 may also have a legacy device bridge 130 providing a connection between PCI bus signals and, for example, an ISA bus having connection points 131–134. In PCI chip sets, such as the AMD-640™ chip set or the Intel 430VX™ chip set, memory controller functionality 106 and host-to-PCI bridge functionality 109 may be combined.

Computer system accessory components 141–146, referred to herein as "agents" or "bus agents," may be connected to the PCI data bus at bus agent connection points 111–116. Bus agents include, for example, a video controller to store graphics data and to provide an interface to a display device, a hard disk controller to access stored programs and data, and a network interface controller providing access to a local area network (LAN). Factors such as electrical loading, signaling voltages, and maximum bus clock frequencies may restrict a bus to a maximum number of bus agents and a maximum data transfer rate.

For a PCI bus to function reliably, precise electrical signal characteristics and device timing requirements must be maintained. These requirements limit the maximum transfer speed and signal path length of the PCI bus. If a processor can send and receive data faster than the PCI bus can receive or send data, as in the case of a Pentium-Pro processor having a 533 Mbytes/second data interface communicating over a PCI bus having a 133 Mbyte/second data transfer rate, a single PCI bus may form a data transfer bottleneck limiting computer system performance. As a result of such a bottleneck, the processor may be required to wait in an idle state while the data transfer is completed. Furthermore, since only a single bus agent may transfer data on a PCI bus at any given time, if there are multiple bus agents simultaneously prepared to transfer data, all but one of the devices must wait for bus access. This bus access delay, known as bus arbitration latency, imposes additional waiting time on bus agents and may further reduce system performance.

Figure 2:
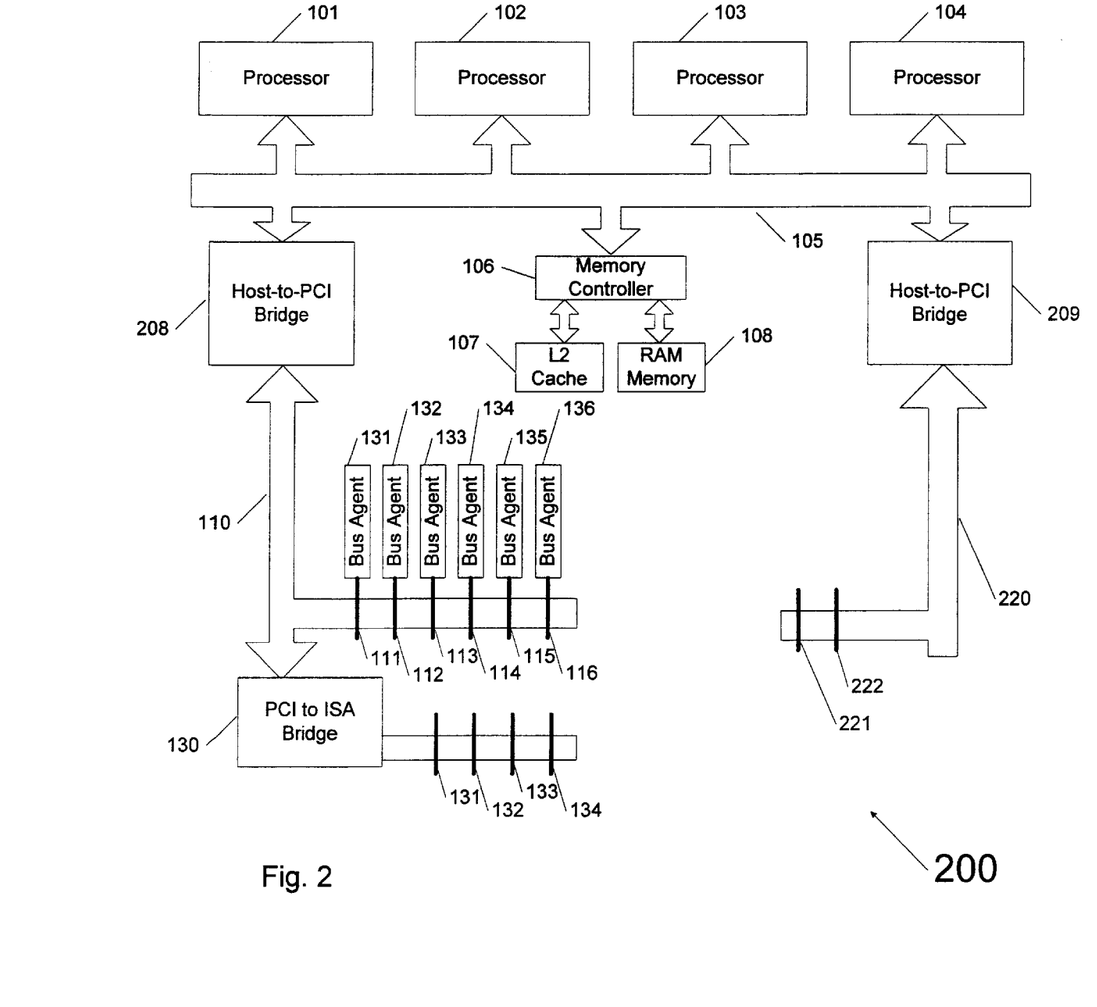
FIG. 2 schematically illustrates a computer system having dual PCI buses.

To reduce processor idle time and to reduce bus arbitration latency, a computer system may be provided with a second PCI bus. Referring to FIG. 2, a computer system 200 having a primary PCI bus 110 and a secondary PCI bus 220 is illustrated. The primary bus 110 is, for example, a 33 MHz 32-bit bus. The secondary bus 220 is, for example, a 66 MHz 32-bit bus. Each bus 110, 220 connects to the processor host bus 105 using a PCI to host bridge 208, 209. Bridge functionality supporting the two buses 110, 220 may be implemented in a single bridge chip, or may be implemented in separate devices. The multiple buses 110, 120 permit system processors 101–104 to initiate and receive data transfers in parallel over two simultaneously operating buses, thereby allowing higher overall data throughput. For example, a 32-bit primary PCI bus operating at 33 MHz can transfer data at 133 Mbytes/second to a hard disk controller bus agent while a 32-bit secondary PCI bus 220 operating at 66 MHz transfers data at 267 Mbytes/second to a video display bus agent, thus allowing a total transfer rate of 400 Mbytes/second over the parallel buses.

In a parallel bus computer architecture, bus agents may still experience bus arbitration latency caused by other bus agents simultaneously requesting access to the same bus. In general, where multiple bus agents share a bus, bus arbitration latency, and associated bus access delays, will rise exponentially as the aggregate bus utilization increases. Thus, in a multiple parallel bus system, optimal system performance can generally be obtained when the amount of data traffic is equally balanced across the buses. Such bus data balancing allows improved utilization of data buffering available in bus control circuitry while reducing bus access delay and bus agent arbitration latency.

In a PCI bus system, effective PCI bus data balancing is constrained by, for example, the number of connection points on each PCI bus, the frequency at which each bus is operated, and the bandwidth utilization of each bus agent. The number of connection points on a PCI bus and the bus operating frequency are, in turn, constrained by the length of the PCI signal propagation path. To meet PCI signal propagation requirements and to allow for sufficient bus agent response times, the PCI bus length and the number of PCI connection points must be decreased as the operating frequency is increased. In conventional PCI bus implementations, signal propagation requirements currently limit 33 MHz PCI buses 110 to approximately six connection points while 66 MHz buses 220 are limited to a maximum of two connection points. Furthermore, bus agents sharing a PCI bus must be operable at a common maximum bus frequency. Consequently, the intermixing of both 33 MHz bus agents and 66 MHz bus agents on a 66 MHz bus will require operation of the 66 MHz bus at a reduced maximum frequency of 33 MHz. For this reason, 33 MHz bus agents are typically placed only on a 33 MHz PCI bus.

Figure 3:
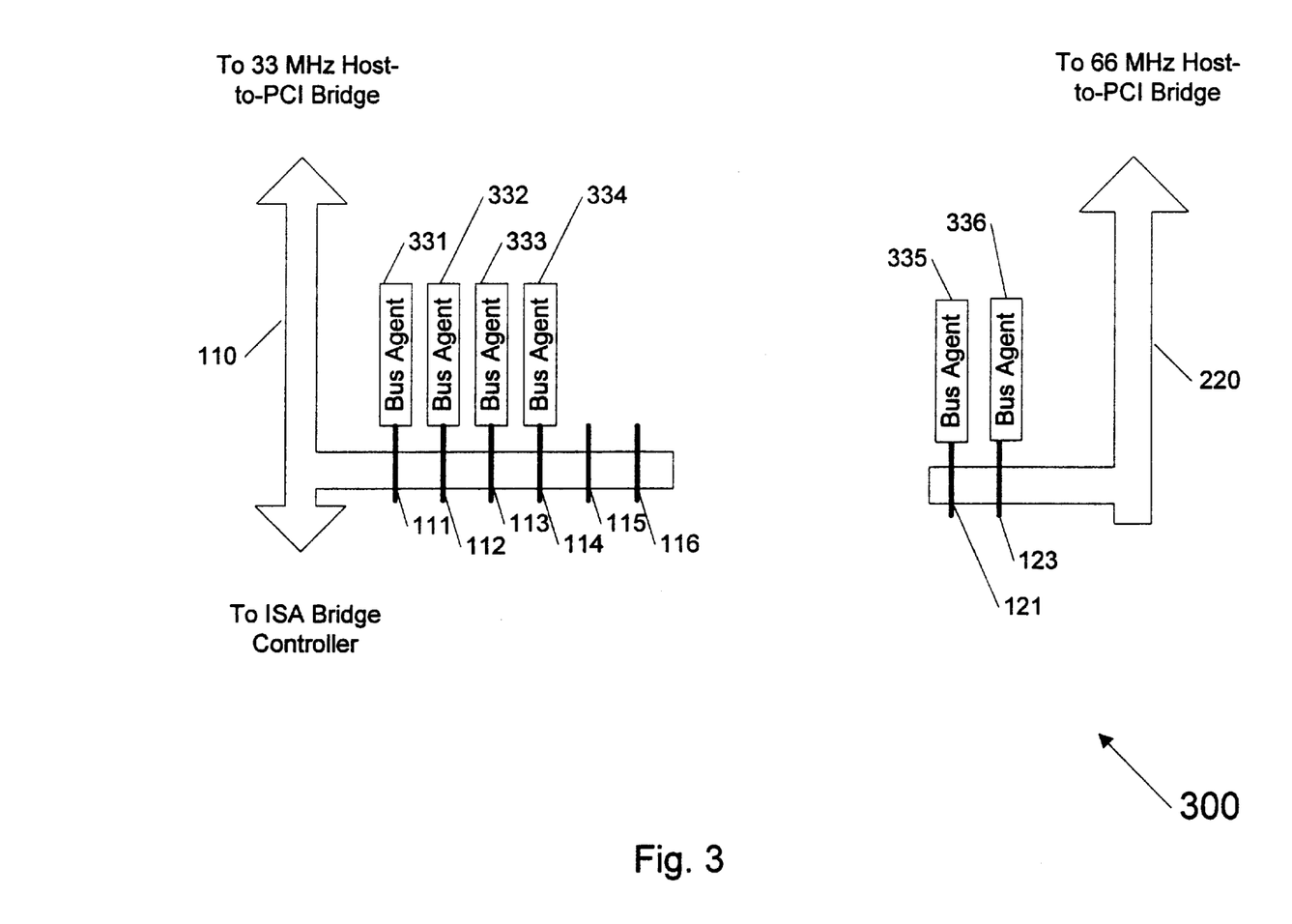
FIG. 3 schematically illustrates a dual PCI bus with connected bus agents.

However, in a dual bus system 200 having a first bus 110 operable at 33 MHz and a second bus 220 operable at 66 MHz and wherein there are no 66 MHz bus agents in use, the efficiency of the system 200 may be improved by moving some of the 33 MHz bus agents from the first bus 110 to the second bus 220 and operating the second bus 220 at a reduced maximum frequency. Referring to FIG. 3, an arrangement 300 of six 33 MHz bus agents 331–336 on two PCI buses is shown. The arrangement 300 includes four bus agents 331–334 on the first bus 110 and two bus agents, 335, 336 on the second bus 220. Although the configuration 300 shows an improvement in performance compared to the system 200, the optimal bus balancing and system performance, assuming each bus agent has similar bus utilization, would be three 33 MHz bus agents on the first bus 110 and three 33 MHz bus agents on the second bus 220.

Figure 4:
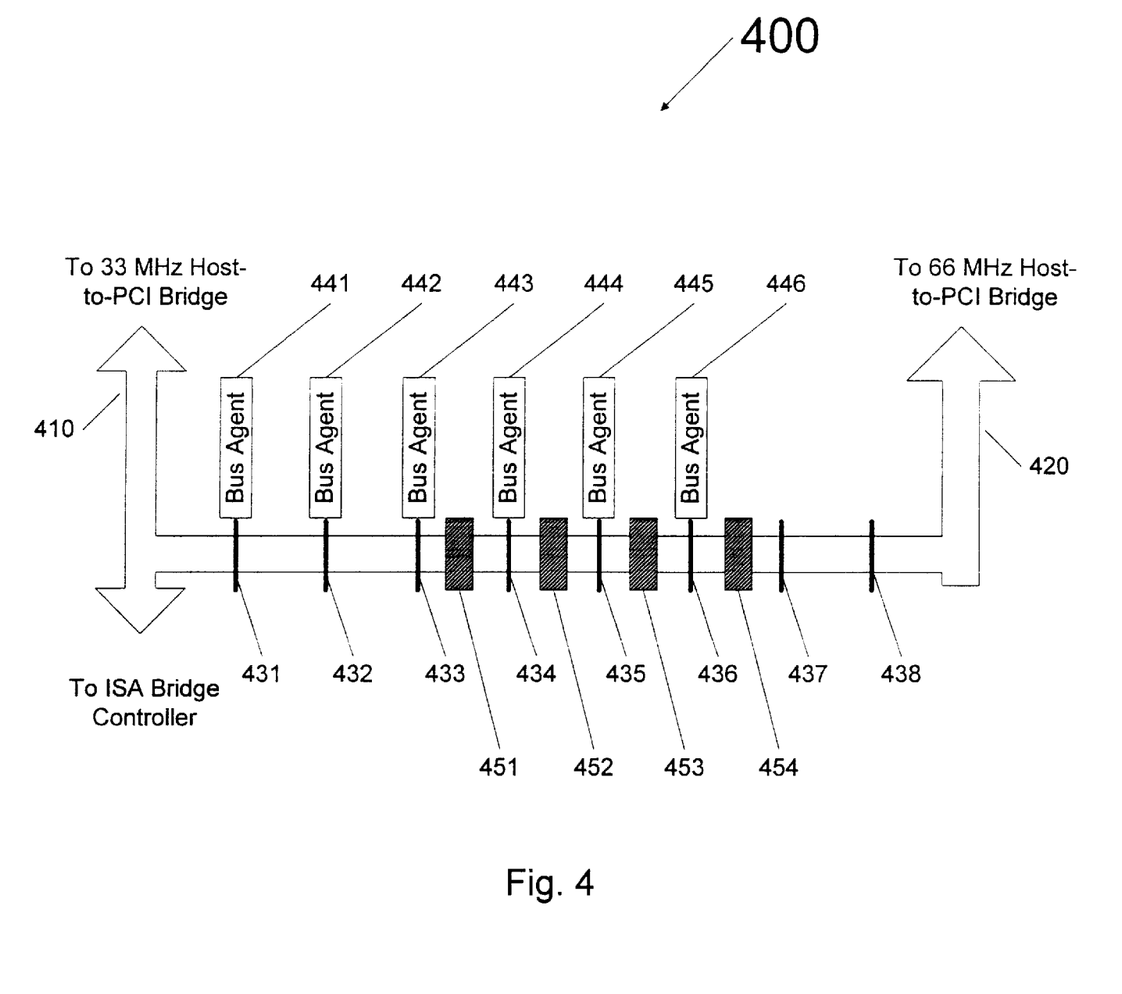
FIG. 4 schematically illustrates a dual PCI bus with configurable bus agent connection points.

Conventional PCI buses, which are constructed using components and connectors mounted on a printed circuit board (the "motherboard"), have a fixed number of bus agent connection points established at the time the motherboard is manufactured. This fixed connection point limitation may prevent optimal bus agent reconfiguration. This limitation may be overcome by the addition of a "flexible connection point" allowing a PCI bus to be reconfigured. Illustrated in FIG. 4, is an exemplary PCI bus for a dual parallel PCI bus computer system. The bus system 400 has flexible connection points 434–436 as illustrated. The bus system 400 supports a first PCI bus 410 connected to, for example, a 33 MHz Host-to-PCI bridge (not shown) and a second PCI bus 420 connected to, for example, a 66 MHz Host-to-PCI bridge (not shown). The host-to-PCI bridges connect to a processor bus such as processor bus 105 in FIG. 2. Of the eight bus agent connection points 431–438, three connection points 431–433 function as conventional 33 MHz bus agent connection points connected to the 33 MHz host-to-PCI bridge by signal traces on a motherboard. Two connection points 437, 438 function as conventional 66 MHz bus agent connection points connected to the 66 MHz Host-to-PCI bridge by signal traces on the motherboard. The remaining connection points 434–436 have signal path connections on the motherboard that pass through bus switches 451–454, respectively.

Figure 5:
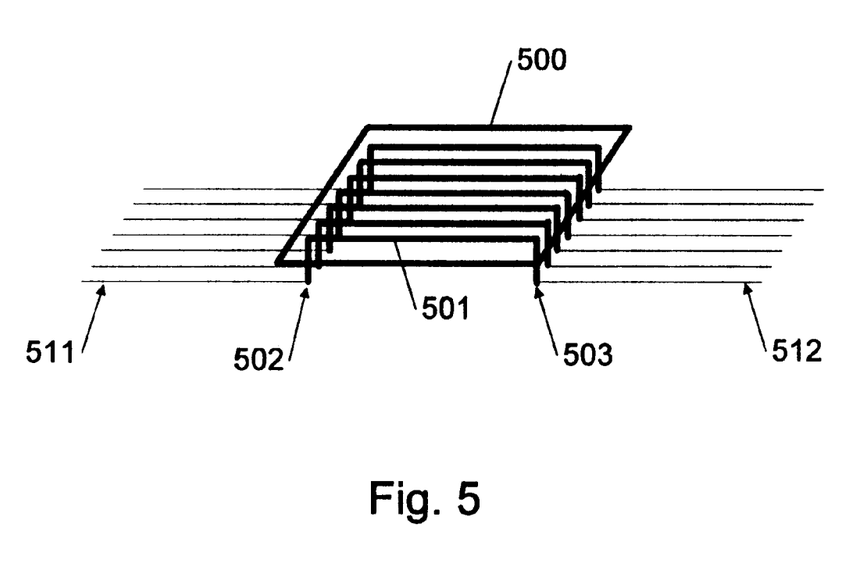
FIG. 5 schematically illustrates a jumper switch.

Bus switches 451–454 may be fashioned from electronic bus switch components such as the Texas Instruments SN74CBT3125 Quadruple Bus Switch or Integrated Device Technology, Inc.'s IDT74ST3257 bus switch. Such electronic bus switches are selectively operable in either a very low impedance state or in a very high impedance state, thereby allowing a data path connection through the switches to be in either an opened (disconnected) or a closed (connected) state. The switches may also be used to provide signal voltage level compatibility between connected buses. Alternatively, as illustrated in FIG. 5, bus switches 451–454 may be implemented using a small circuit board 500 with connectors 502, 503 on either end that provide jumpers 501 between signal traces 511, 512 on the main circuit board. Other options include electro-mechanical relays, cross-bar switches or any other device operable in a very low impedance state and a very high impedance state. Switches 451–454 allow any required PCI signal characteristics to be maintained.

Referring again to FIG. 4 and to Table 1, flexible connection points 434–436 may be connected either to the first data bus 410 or to the second data bus 420, or may be disconnected from both buses by changing the state of switches 451–454. For example, if switches 451 and 454 are in the open state, signals from the first bus will terminate at switch 451 and signals from the second bus will terminate at switch 454, thus connection points 434–436 will be disconnected from both buses. If switch 451 is in the closed state and switch 452 is in the open state, signals from the first bus will terminate at 452, thus connection point 434 will be connected to the first bus. Still another alternative is for switches 451, 453, 454 to be in the closed state and 452 to be in the open state resulting in connection point 434 being connected to the first bus and connection points 435, 436 being connected to the second bus. Additional bus configuration alternatives are as listed in Table 1. Switches 451–454 cannot all be in a closed state as this would provide an invalid signal path connection coupling the first bus 410 to the second bus 420.

TABLE 1

| Switch 451 State | Connection point 434 Connection | Switch 452 State | Connection point 435 Connection | Switch 453 State | Connection point 436 Connection | Switch 454 State |
|---|---|---|---|---|---|---|
| closed | invalid | closed | invalid | closed | invalid | closed |
| closed | Bus 410 | closed | Bus410 | closed | Bus 410 | open |
| closed | Bus 410 | closed | Bus 410 | open | Bus 420 | closed |
| closed | Bus 410 | closed | Bus 410 | open | disconnected | open |
| closed | Bus 410 | open | Bus 420 | closed | Bus 420 | closed |
| closed | Bus 410 | open | disconnected | closed | disconnected | open |
| closed | Bus 410 | open | disconnected | open | Bus 420 | closed |
| closed | Bus 410 | open | disconnected | open | disconnected | open |
| open | Bus 420 | closed | Bus 420 | closed | Bus 420 | closed |
| open | disconnected | closed | disconnected | closed | disconnected | open |

TABLE 1-continued

| Switch 451 State | Connection point 434 Connection | Switch 452 State | Connection point 435 Connection | Switch 453 State | Connection point 436 Connection | Switch 454 State |
|---|---|---|---|---|---|---|
| open | disconnected | closed | disconnected | open | Bus 420 | closed |
| open | disconnected | closed | disconnected | open | disconnected | open |
| open | disconnected | open | Bus 420 | closed | Bus 420 | closed |
| open | disconnected | open | disconnected | closed | disconnected | open |
| open | disconnected | open | disconnected | open | Bus 420 | closed |
| open | disconnected | open | disconnected | open | disconnected | open |

The status of bus switches 451–454 may be changed either electronically or mechanically. If switches 451–454 are implemented using electronic bus switches, then software and hardware in the computer system can control the state of the switches. If the switches are implemented by the jumper 500 in FIG. 5, manual insertion or removal of the jumper will be required.

Figure 6:
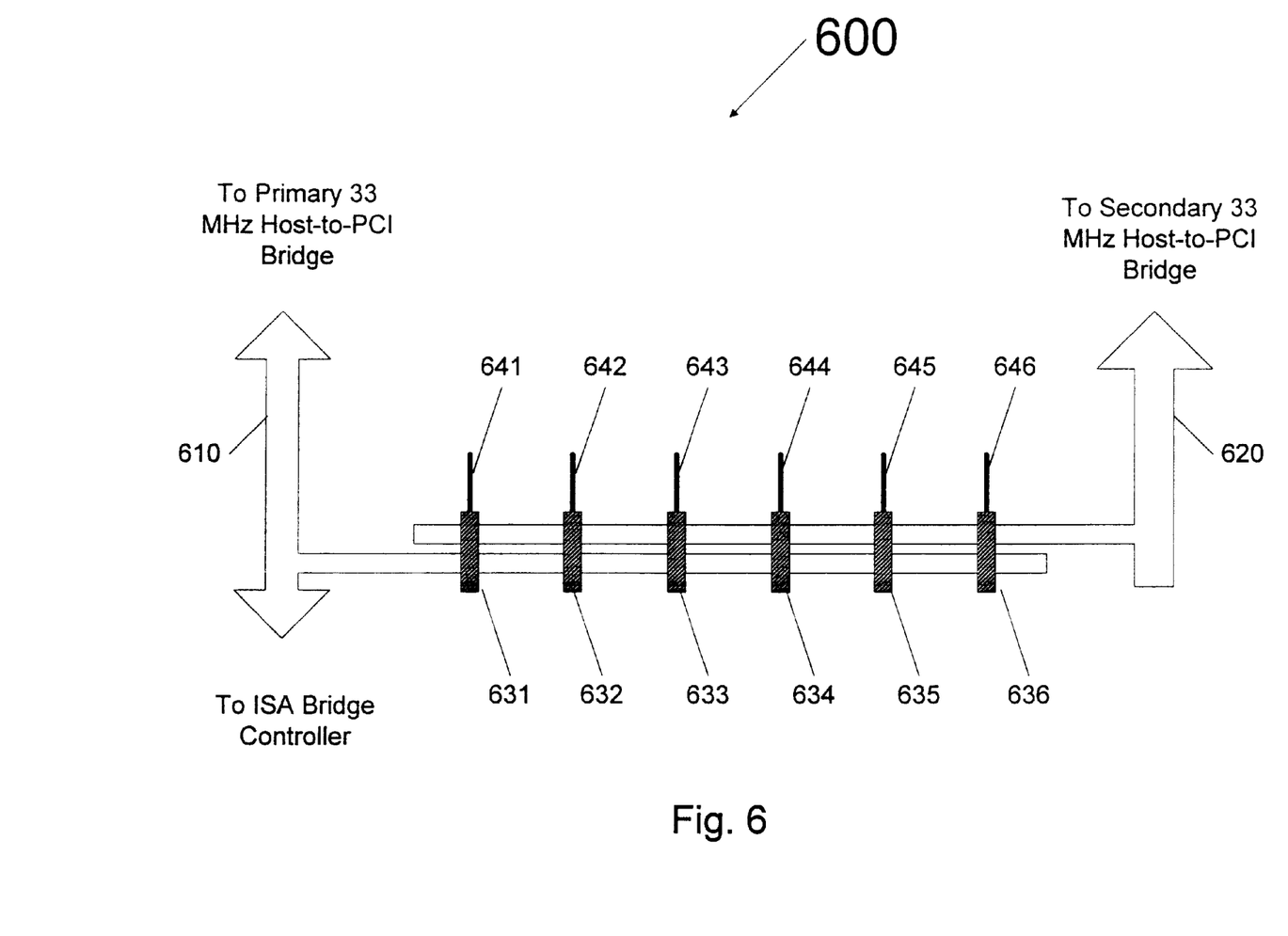
FIG. 6 schematically illustrates a dual PCI bus system with configurable bus agent connection points.
Figure 7A:
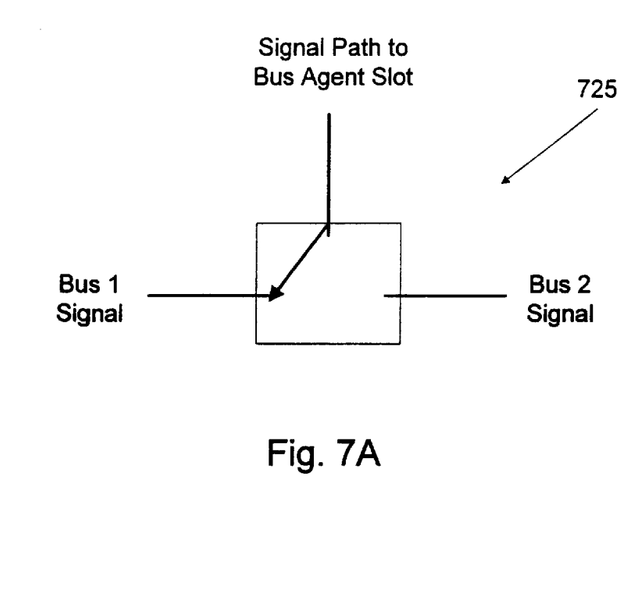
FIGS. 7A and 7B schematically illustrate a bus switch.
Figure 7B:
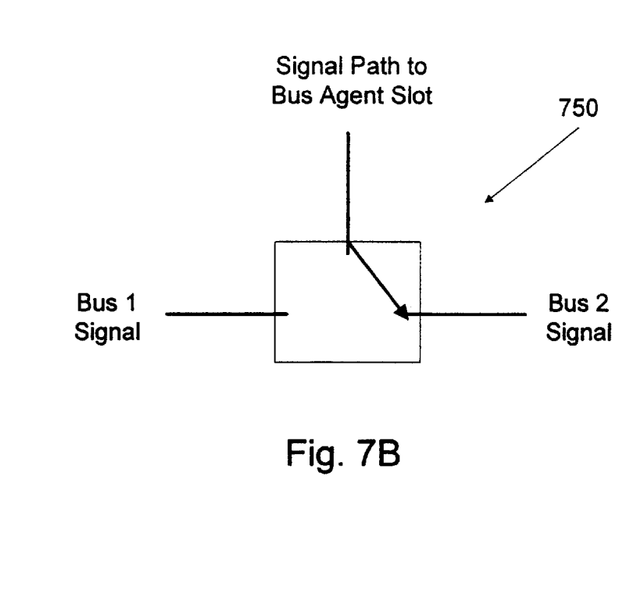

Other embodiments are within the scope of the following claims. For example, flexible connection points may be used to provide a computer system with fully reconfigurable bus agent connection points operating on dual buses. Illustrated in FIG. 6 is the dual bus portion of an exemplary computer system having fully reconfigurable dual PCI buses. The dual bus system 600 has parallel buses 610, 620 connected to bridge circuits. The bus system 600 is constructed on a motherboard. Signal traces on the motherboard form bus 610, 620 signal paths are connectable to each bus switch 631–636. In the bus system 600, flexible connection points 641–646 may be connected to either bus 610, 620. Referring to FIGS. 7A and 7B, to provide for flexible connection point 631–636 connection to either bus 610, 620, the switches 631–636 are operable in a first state 725 in which signals from the bus agent connection point are coupled to the first bus and in a second state 750 in which signals from the bus agent connection point are coupled to the second bus. Optionally, switches 631–636 may be operated in a third state in which a connection point 631–636 is not coupled to a bus. The fully reconfigurable dual bus system 600 may also employ additional switches along each bus 610, 620 enabling the signal path propagation length for a bus 610, 620 to be adjusted and, correspondingly, allowing the maximum operating frequency of the bus to be altered.

Figure 8:
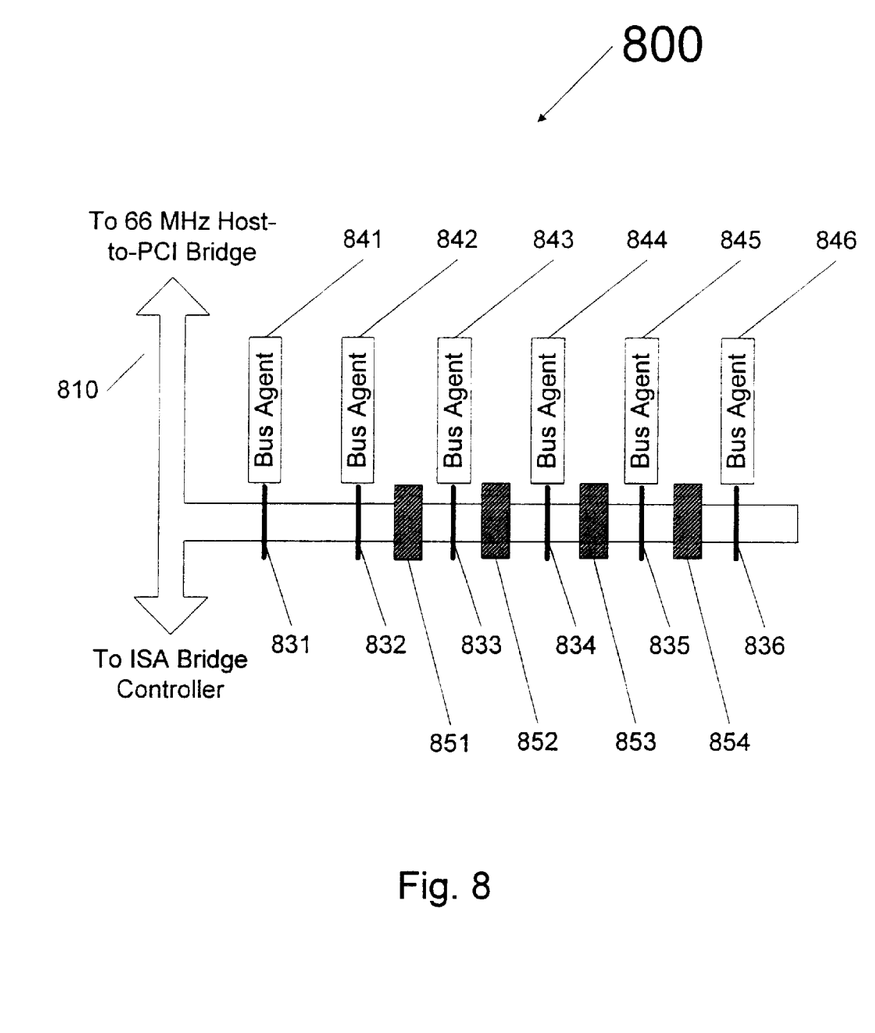
FIG. 8 schematically illustrates a PCI bus system with a single PCI bus and having reconfigurable bus agent connections, and FIGS. 9A and 9B schematically illustrate a bus switch having terminating resistors.

In another embodiment, flexible connection points may be used to reconfigure a single bus. In conventional PCI buses, bus characteristics such as bus length and maximum bus operating frequency are determined by the computer system manufacturer at the time of manufacture. Flexible connection points may be used to allow a computer system user to determine bus characteristics most suitable to the user. Illustrated in FIG. 8 is a computer system having flexible connection points 831–836 on a single PCI bus 810. The system 800 may have, for example, a PCI bridge operable at up to 66 MHz and connected to bus agent connection points 831, 832 using conventional signal traces on a motherboard. Additionally, the system 800 has, for example, four flexible connection points 833–836 that may be connected to or disconnected from the bus 810 by the use of bus switches 851–854. As bus switches 851–854 are changed from a open to a closed state, connection points 833–836 are connected to the bus 810 and the bus propagation path is lengthened. Alternatively, as data path switches 851–854 are changed from a closed to an open state, the effective bus propagation length is decreased.

By altering the states of switches 851–854, the bus 810 is operable with either two connection points 831–832, three connection points 831–833, four connection points 831–834, five connection points 831–835, or six connection points 831–836. For example, when switch 851 is in an open state, flexible connection points 833–836 are disconnected from the bus resulting in a bus supporting two bus connection points 831, 832. The resulting two connection point bus has a short signal path length and is operable at a maximum bus frequency, such as, for example, 66 MHz. Users requiring more than two bus agents can elect to place a third bus agent at connection point 833, a fourth bus agent at connection point 834, a fifth bus agent at connection point 835 and a sixth bus agent at connection point 836. The third, fourth, fifth, and sixth bus agents may then be coupled to the bus signal traces by closing switches 851–854. As additional bus agents are added and additional switches 851–854 are operated in a closed state, the bus signal propagation path length is increased. The increase in signal path length may require a reduction in maximum bus operating frequency.

Figure 9A:
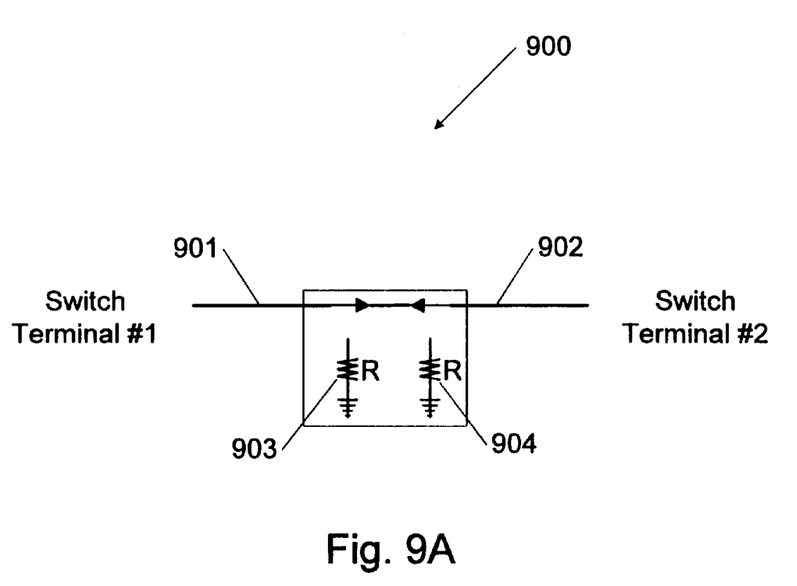
Figure 9B:
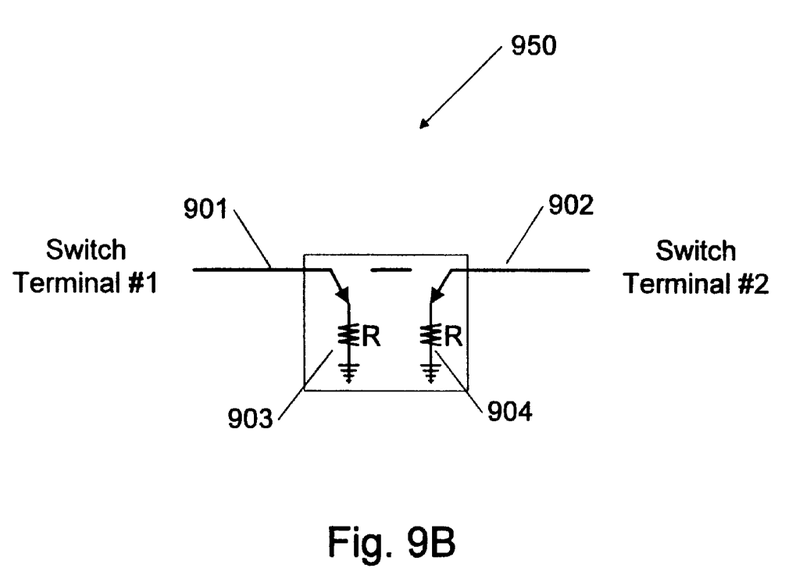

The invention may also be used with other bus structures such as small computer system interface (SCSI) buses. SCSI buses, like PCI buses, are available in different implementations including SCSI-1, SCSI-2, Fast SCSI-2, Fast-Wide SCSI 2, and Fast-Wide SCSI 3. These variations may differ in bus frequency and/or data path width. SCSI bus speed is typically limited by the slowest device on the bus. For example, a SCSI bus having a mixture of SCSI-2 and Fast SCSI-2 devices will be limited to SCSI-2 speeds. A dual SCSI bus system may be implemented using bus switches to control the separation point between interconnected dual SCSI buses. Such a dual SCSI bus systems may be fashioned similarly to the PCI buses in FIG. 4 and FIG. 6. Bus switches on a SCSI bus may need to provide bus signal terminations. Illustrated in FIGS. 9A and 9B are bus switches 900, 950 providing bus signal terminations. In the closed state 900 the bus switch provides a signal path between a first switch terminal 901 and a second switch terminal 902. In an open state 950, the signal path from the first terminal 901 is terminated through a grounding resistor 903 and the signal path from the second switch terminal 902 is terminated through a second grounding resistor 904.

The invention may also include monitoring circuitry to examine bus traffic and dynamically reconfigure bus agent connection points from one data bus to another. This may be used to improve system performance or as a means to prevent or recover from system failures. Monitoring circuitry may be implemented in a programmed array logic (PAL) circuit, in host bridge circuitry, in processor circuitry, or in other system circuitry and may interoperate with operating system software to monitor bus activity and to initiate switching of bus agent connection points.

Computer buses with fewer or greater numbers of bus agent connections may be built and, correspondingly, a larger or smaller number of bus switches may be used. Bus agent connection points may include a connector allowing bus agents to be selectively received by at the connection point and removed from the connection point. Alternatively, bus agent connection points may permanently receive a bus agents, such as by solder mounting bus agent devices directly to signal traces on a motherboard. Additionally, flexible connection points can be arranged in groups such that bus switches change the characteristics of groups of connection points. This invention may be used with, for example, Fiber Channel buses, IEEE 1394 buses, Universal Serial Buses (USB), SCSI buses, Pentium-Pro™ host buses, or other communications buses. In all cases, the term "bus agent" refers to a device that may be connected to the bus at a connection point.

What is claimed is:

1. A computer system comprising:
   a first bus;
   a second bus;
   a first bridge coupled between the first bus and one end of the second bus;
   a second bridge coupled between the first bus and an opposite end of the second bus; and
   at least two switches coupled in the path of the second bus such that the second bus includes at least three portions, a first portion disposed between a first one of the switches and the first bridge, a second portion disposed between the first one of the switches and a second one of the switches, and a third portion disposed between the second one of the switches and the second bridge, wherein the second portion of the second bus is functionally coupled to either the first bridge or the second bridge based on the state of the at least two switches.

2. The system of claim 1 wherein said at least two switches includes bus signal termination functionality.

3. The system of claim 2 wherein said bus signal termination functionality comprises a resistive element selectively coupled to the second bus.

4. The system of claim 1 wherein the second bus has signal paths formed on a motherboard.

5. The system of claim 1 wherein the at least two switches comprise electronic bus switch components.

6. The system of claim 1 wherein the at least two switches comprise a circuit board that includes connectors to provide jumpers.

7. The system of claim 1 wherein the at least two switches comprise electro-mechanical relays.

8. The system of claim 1 wherein the at least two switches comprise cross-bar switches.

9. The system of claim 1 wherein the first bus comprises a processor host bus.

10. The system of claim 1 wherein the second bus comprises a PCI bus.

11. The system of claim 1 wherein the second bus comprises a SCSI bus.

12. The system of claim 1 wherein the first bridge communicates with the first portion of the second bus at one speed and wherein the second bridge communicates with the third portion of the second bus at a second speed.

13. The system of claim 12 wherein the first speed is about 33 MHz and the second speed is about 66 MHz.

14. The system of claim 1 wherein the at least two switches comprise more than two switches.

15. The system of claim 1 and further comprising a plurality of peripheral devices coupled to the second bus.

16. The system of claim 1 and further comprising monitoring circuitry to examine traffic between the first bus and the second bus and to cause the at least two switches to change states based upon the traffic.

17. A computer system comprising:
    a first bus disposed on a circuit board;
    a second bus disposed on the circuit board;
    a third bus disposed on the circuit board;
    a first bridge disposed on the circuit board and coupled between the first bus and the second bus;
    a second bridge disposed on the circuit board and coupled between the first bus and the third bus; and
    a plurality of bus agents, each bus agent coupled to a switch disposed on the circuit board the switch being configured to couple the bus agent to either the second bus or the third bus.

18. The system of claim 17 wherein the second bus and the third bus comprise PCI buses.

19. The system of claim 17 wherein the first bus comprises a host processor bus.

20. The system of claim 19 and further comprising at least one microprocessor coupled to the host processor bus.

21. The system of claim 17 wherein the switch is configurable in a third state such that a bus agent coupled to the switch is not coupled to either the second bus or the third bus.

22. A computer system that includes a bus structure with a reconfigurable length the system comprising:
    a microprocessor coupled to a host bus;
    an expansion bus disposed on a motherboard and including a plurality of bus agent connection points;
    a bridge disposed on the motherboard and coupled to the expansion bus, each of the bus agent connection points accessible by the microprocessor through the bridge; and
    a bus switch disposed on the motherboard and coupled in the expansion bus between at least one of the bus agent connection points and the bridge, wherein the computer system can operate in a first mode wherein the bus switch is closed and the at least one bus agent connection point is accessible to the microprocessor through the bridge or the computer can alternatively operate in a second mode wherein the bus switch is opened and the least one bus agent connection is not accessible to the microprocessor through the bridge.

23. The system of claim 22 wherein the bus switch includes bus signal termination functionality.

24. The system of claim 22 wherein the bus signal termination functionality comprises a resistive element selectively coupled to the bus.

25. The system of claim 22 wherein the bridge is connected to the host bus and is also connected to the expansion bus.

26. The system of claim 22 wherein the expansion bus is operating in a first bus operating frequency range when the switch is closed and operable in a second bus operating frequency range when the switch is closed, wherein the second bus operating frequency range has a greater maximum operating frequency that the first bus operating frequency range.

27. The system of claim 22 and further comprising a bus agent coupled to one of the bus agent connection points.

28. The system of claim 22 and further comprising a second bus switch coupled in the expansion bus.

29. A computer system comprising:
    at least one microprocessor coupled to a host processor bus;
    system memory coupled to the at least one microprocessor through the host processor bus;

an expansion bus;

a plurality of peripheral devices coupled to the expansion bus;

a first bridge coupled to one end of the expansion bus, at least one of the peripheral devices accessible by the at least one microprocessor through the first bridge;

a second bridge coupled to an opposite end of the expansion bus, at least another one of the peripheral devices accessible by the at least one microprocessor through the second bridge; and at least two switches coupled in the path of the expansion bus such that the expansion bus includes at least three portions, a first portion disposed between a first one of the switches and the first bridge, a second portion disposed between the first one of the switches and a second one of the switches, and a third portion disposed between the second one of the switches and the second bridge, wherein the second portion of the expansion bus is functionally coupled to either the first bridge or the second bridge based on the state of the at least two switches.

30. The system of claim 29 wherein the expansion bus comprises a PCI bus.

* * * * *